UNITED STATES PATENT OFFICE.

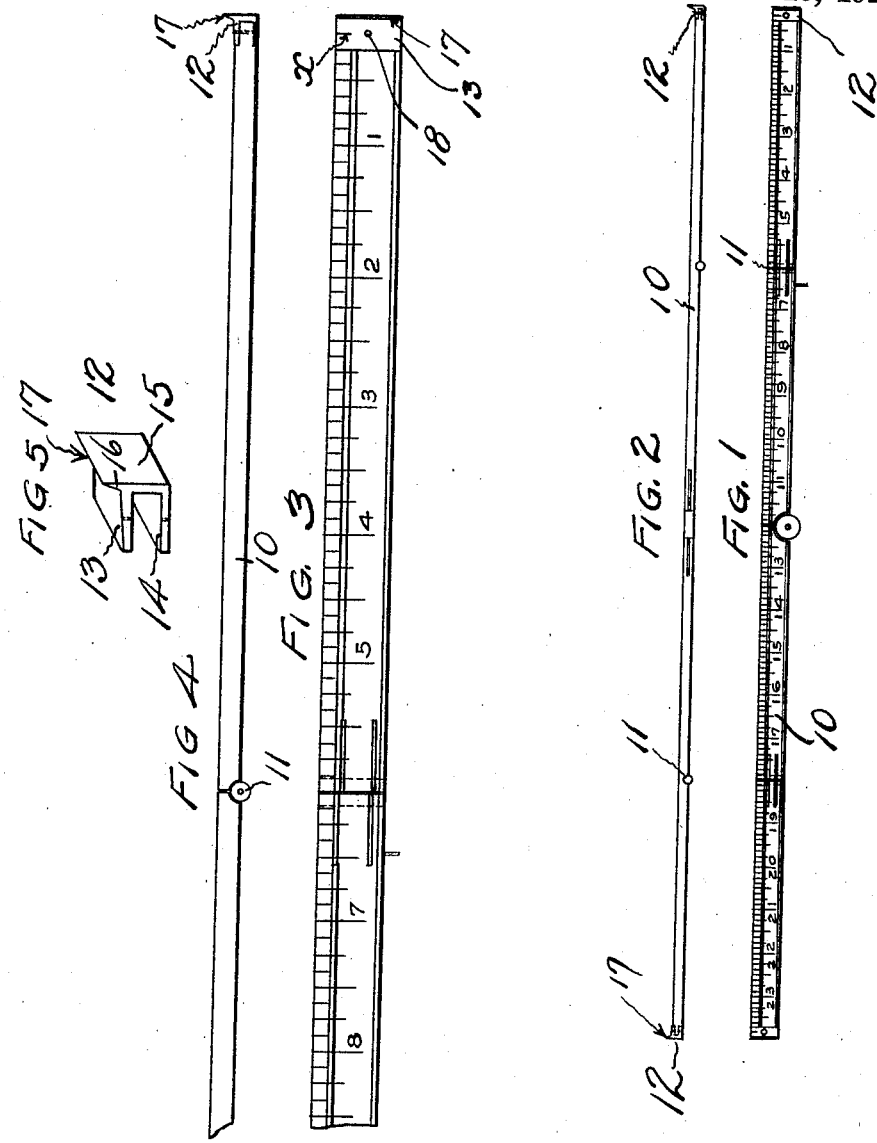

ROY C. SHOWALTER, OF ALTOONA, PENNSYLVANIA.

MEASURING INSTRUMENT.

1,394,229. Specification of Letters Patent. Patented Oct. 18, 1921.

Application filed September 26, 1919. Serial No. 326,447.

*To all whom it may concern:*

Be it known that I, ROY C. SHOWALTER, a citizen of the United States, residing at Altoona, in the county of Blair and State of Pennsylvania, have invented certain new and useful Improvements in Measuring Instruments, of which the following is a specification.

This invention relates to measuring instruments and has particular reference to an improvement in rules of the integral or folding type which facilitates the accurate marking off of the distance measured.

Therefore, the primary object of this invention is to provide an improved rule-end or marking tip whereby the exact measurement of one foot, two feet or any multiple thereof can be readily and accurately obtained. In this connection it is proposed to provide a rule-end having a precision line or marking edge made integral therewith whereby the mechanic may make a permanent mark to indicate the exact measurement at once without the use of such devices as pencils, chalk or the like, all of which from a mechanic's point of view are inaccurate, since they usually lengthen the measurement.

With these and other objects in view which will be more readily apparent as the nature of the invention is better understood, the same consists in the novel construction, and combination of parts as will be hereinafter fully pointed out, illustrated and claimed.

It will be quite readily understood by those skilled in the art to which this invention belongs that the same is susceptible to some structural modification or design without departing from the spirit or scope of the invention, but a preferred and practical embodiment of the invention is shown in the accompanying drawings, in which:—

Figure 1 is a plan view of a two foot rule in an extended position, having my invention applied thereto.

Fig. 2 is an edge view of the parts shown in Fig. 1.

Fig. 3 is a full sized view of a portion of a two foot rule showing the application of my device applied thereto.

Fig. 4 is an edge view of the parts shown in Fig. 3 of the drawings.

Fig. 5 is a full sized view in perspective of my improved marking tip showing more distinctly the manner of constructing the marking edge which is designed to give the exact measurement desired.

Similar reference numerals refer to similar parts throughout the several figures of the drawings.

In carrying out this invention no change is contemplated in the usual construction of the body of the rule designated by the numeral 10, or the hinges 11. The invention is therefore adaptable to rules now in use, thereby increasing its range of utility.

One of the distinctive features of the present invention is the provision of a cap or tip unit that serves as a guard for the end of the rule while at the same time being constructed to also perform the functions of a marking device. Referring to the drawings it will be observed that the tip unit is designated in its entirety by the reference 12, and essentially consists of the spaced apart wing portions 13 and 14 which are connected at one end by a wall or web 15 which is preferably somewhat thicker than the wings and extends to one side of the wing 13 for instance, as indicated at 16 to provide a tapering knife blade which terminates in the relatively sharp marking edge 17. The tip unit 12 is therefore of substantially U-shaped formation and the spaced apart wings 13 and 14 thereof constitute a socket for receiving one end of the body of the rule. This arrangement thereby conveniently provides for the attachment of the tip to the rule through the use of suitable fastenings 18 which may be in the form of rivets or the like. The wings 13 and 14 may be of any desired length to insure the rigid fastening of the tip to the body of the rule, and therefore the said wings may have a portion of the scale of the rule marked thereon as indicated at *x* in Fig. 3.

As will be observed more especially from Figs. 2 and 4 of the drawings the marking edge 17 of the tip is precisely coincident with the scale mark at the end of the rule which insures an absolute accurate marking when the workman manipulates the tool in such a manner as to cause the knife edge 17 to scratch or otherwise mark the surface being measured. The entire tip may be constructed out of any material suitable for the purpose, and as above indicated the end wall 15 is preferably heavier than the wings 13 and 14 so that the same may resist any bending action that may occur in the case the rule is accidentally dropped on its end.

In applying this improvement to the usual two foot rule for instance the knife edge 17 is preferably placed on the side opposite the hinge 11, in order that the hinge will not interfere with laying the rule from on the work to be measured, and when in use the workman turns the edges 17 down on the work to be measured and by a slight pressure stroke a line is left by the knife edge indicating the exact measurement without the aid of a pencil, scriber or the like.

I claim:—

A folding rule having one end provided with a marking tip consisting of a body having spaced apart wings for receiving between them said end of the rule, said body also having a tapering knife blade portion offset from one side only thereof, said knife blade portion extending transversely of the entire end of the rule and located in the outside face of the rule when the latter is in its folded position.

In testimony whereof I hereunto affix my signature in the presence of two witnesses.

ROY C. SHOWALTER.

Witnesses:
EMORY L. GROFF,
GEORGE H. MACDONALD.